Patented Nov. 11, 1924.

1,514,693

UNITED STATES PATENT OFFICE.

GEORG GRAU AND PAUL B. ROTHER, OF CHEMNITZ, GERMANY.

METHOD FOR PREVENTING THE TURNING BLUE OF WOOD.

No Drawing.    Application filed January 5, 1923.   Serial No. 610,938.

*To all whom it may concern:*

Be it known that we, GEORG GRAU and PAUL B. ROTHER, citizens of the German Republic, both residing at Chemnitz, Germany, have invented certain new and useful Improvements in Methods for Preventing the Turning Blue of Wood (for which we have filed application for patent on the 7th of January, 1922, in Germany, Patent No. 362,301), of which the following is a specification.

As the timber trade and industry suffer considerable loss through the turning blue of certain timber, especially pine-timber, several impregnating processes have been proposed designed to suppress the principal cause of the turning blue, viz the growth of certain fungi especially of the *Ceratostomella pilifera*. Green wood exclusively treated with such solutions of fungus destroying substances which do not alter the natural colour of the wood so that only the salts of mercury, principally sublimate- and fluorine-solutions are used. These solutions diffuse however rather quickly and crystallize in the timber so that they cannot form a uniform and continuous protecting layer against the penetration of the fungus-spires. This explains why part of the timber treated in this manner turn blue subsequently so that this method is not absolutely secure.

This invention has for its object to prevent, even under the most favorable conditions of developement, the colouring fungi from penetrating into the wood cells by producing, directly below the surface of the wood, a colloidal protecting layer which diffuses only with difficulty, is pervious to water persevering and capable to separate continuously fungi-destroying substances which prevent the colouring of the wood.

The well known not easily crystallizing salts of the complex mercuric sulphurous acids preferably chloride mercuric bisulphite of sodium, are very suitable for this purpose. This compound is easily produced in aqueous solution from molecular quantities of sublimate and sodium sulphite or bisulphite, but it is very difficult to prepare the same in the crystalline form and it supplies at the precipitation only a gelatinous pulp. If a solution of the said compounds evaporates upon wood the formation of very thin fungi-killing protecting layers is favoured by the colloid of the sap in the cellules, said layer penetrating into the wood only very slowly owing to its colloidal character and which lasts for a very long time in consequence of the lack of capability of its principal constituent to assume the crystalline form. At the very slow and complicated decomposition of this layer, which passes over the little soluble and lasting mercuric sulphurous sodium, sulphurous acid, sulphite and sublimate are produced besides calomel, these being all substances which are strongly fungi-poisonous and which prevent colouring. The penetration of the spores into the wood and the development of the same is absolutely prevented by the products from decomposition of the layer which dissolve in the outfiltering saps. The sulphurous acid which is separated or the salt of the same prevents other discolouring.

The complex mercury-sulphite compounds, specially mercuric chloride-alkaline-sulphite, react in the wood cells in a similar manner as the mercury salts which have been used hitherto for the preservation of wood, so far as the complex binding of the mercury is of importance. The above mentioned complex salts of mercury sulphite differ however from the substances commonly used for the same purpose by their surprising effect in so far as they prevent, even under the least favorable conditions, the natural discolouring of the wood, particularly the turning blue of the pine, as has been proved by extensive experiments on a large scale. This special effect of preventing the colouring has never been obtained even approximately with the anorganic and organic mercury salts applied under the same conditions, and it is apparently due to the penetration of sulphurous acid into the molecule.

The process is carried out in the following manner: The wood which must preferably be as fresh as possible is coated with a solution which consists of one liter of water to which a quantity of sublimate and of sodium sulphite or bisulphite is added with amounts to about one hundreth of the molecular weight of the substance, said quantity being however varied in accordance with the actual condition of the wood to be treated. The coating is effected by immersion, squirting or painting. The coating is allowed to dry as usual. The solutions of the components could also be applied one after the other.

We claim:—

A method for preventing the turning blue of timber consisting in coating the timber with a solution of sublimate and sodium sulphite in water (one hundredth of the molecular weight of the substance in one liter of water) so that a protecting layer is formed which does not easily assume the crystalline form and at the decomposition of which fungi-killing and colouring-preventing substances are separated.

In testimony whereof we affix our signatures in presence of two witnesses.

GEORG GRAU.
Dr. PAUL B. ROTHER.

Witnesses:
U. ROEDER,
JOSEPHE VON FESCHAU.